US008836255B2

(12) United States Patent
Nishimura et al.

(10) Patent No.: US 8,836,255 B2
(45) Date of Patent: Sep. 16, 2014

(54) CONTROL DEVICE (75) Inventors: Keisuke Nishimura, Anjo (JP); Takeshi Aoki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 48 days.

(21) Appl. No.: 13/876,970

(22) PCT Filed: Dec. 8, 2011

(86) PCT No.: PCT/JP2011/078425
§ 371 (c)(1),
(2), (4) Date: Mar. 29, 2013

(87) PCT Pub. No.: WO2012/077752
PCT Pub. Date: Jun. 14, 2012

(65) Prior Publication Data
US 2013/0187582 A1  Jul. 25, 2013

(30) Foreign Application Priority Data
Dec. 10, 2010 (JP) ................. 2010-275966

(51) Int. Cl.
H02P 23/12 (2006.01)
H02P 23/14 (2006.01)
H02P 6/14 (2006.01)
H02P 6/10 (2006.01)
G01D 5/244 (2006.01)

(52) U.S. Cl.
CPC ............... *H02P 6/145* (2013.01); *H02P 23/14* (2013.01); *H02P 6/142* (2013.01); *H02P 6/10* (2013.01); *G01D 5/24471* (2013.01)
USPC .................................. 318/400.14

(58) Field of Classification Search
CPC ..................................................... H02P 25/023
USPC ........................................................ 318/400.14
See application file for complete search history.

(56) References Cited

U.S. PATENT DOCUMENTS 6,674,262 B2 * 1/2004 Kitajima et al. .............. 318/722
7,047,145 B2   5/2006 Ishizuka et al.
(Continued)

FOREIGN PATENT DOCUMENTS

JP   A-2004-222448   8/2004
JP   A-2005-37305    2/2005
(Continued)

OTHER PUBLICATIONS

Mar. 13, 2012 International Search Report issued in International Patent Application No. PCT/JP2011/078425 (with translation).

*Primary Examiner* — Erick Glass
(74) *Attorney, Agent, or Firm* — Oliff PLC (57) ABSTRACT

A control device that controls an electric motor drive device including a DC/AC conversion section that converts a DC voltage into an AC voltage using a detected angle detected by a resolver provided in an AC electric motor to supply the resulting AC voltage to the AC electric motor. The control device includes a correction information acquisition section that acquires first correction information on the basis of the rotational speed, and that acquires the second correction information on the basis of the modulation rate at the angle acquisition time point in the case where the rotational speed at the angle acquisition time point is less than the rotational speed threshold. A detected angle correction section corrects the detected angle on the basis of the correction information acquired by the correction information acquisition section.

6 Claims, 6 Drawing Sheets

(56) References Cited

U.S. PATENT DOCUMENTS

| | | | |
|---|---|---|---|
| 7,482,777 B2* | 1/2009 | Tomigashi | 318/807 |
| 7,723,945 B2* | 5/2010 | Okamura | 318/805 |
| 8,035,330 B2* | 10/2011 | Maeda et al. | 318/721 |
| 8,339,076 B2* | 12/2012 | Aoki et al. | 318/400.04 |
| 2004/0150359 A1 | 8/2004 | Yaguchi et al. | |
| 2010/0327786 A1 | 12/2010 | Aoki et al. | |

FOREIGN PATENT DOCUMENTS

| | | |
|---|---|---|
| JP | A-2006-262582 | 9/2006 |
| JP | A-2007-33412 | 2/2007 |
| JP | A-2009-100615 | 5/2009 |
| JP | A-2010-96708 | 4/2010 |
| JP | A-2011-13006 | 1/2011 |
| WO | WO 2010/109964 A1 | 9/2010 |

* cited by examiner

CONTROL DEVICE

INCORPORATION BY REFERENCE

The disclosure of Japanese Patent Application No. 2010-275966 filed on Dec. 10, 2010 including the specification, drawings and abstract is incorporated herein by reference in its entirety.

BACKGROUND OF THE INVENTION

The present invention relates to a control device that controls an electric motor drive device including a DC/AC conversion section that converts a DC voltage into an AC voltage using a detected angle detected by a resolver provided in an AC electric motor to supply the resulting AC voltage to the AC electric motor.

DESCRIPTION OF THE RELATED ART

In order to accurately control an AC electric motor, the AC electric motor is occasionally provided with a resolver so that an electric motor drive device that drives the AC electric motor is controlled using a detected angle detected by the resolver. In such a case, if the detected angle detected by the resolver has an error, an AC voltage input to or output from the AC electric motor may be excessively high or excessively low, which may reduce output torque from the AC electric motor or cause ripples in the output torque, or may cause ripples in electric power drawn from or supplied to a power source.

In relation to such a detection error of the resolver, Japanese Patent Application Publication No. 2005-37305 (JP 2005-37305 A) describes a detected position correction device (control device) that corrects a detected position (detected angle) detected by a resolver on the basis of error information obtained through measurement performed in advance. In the control device according to JP 2005-37305 A, not only a static error but also a dynamic error is corrected so that the position detection accuracy of the resolver can be enhanced even in the case where the rotational speed of a rotator of the resolver is high (paragraph [0009]).

In a configuration in which an electric motor drive device including a DC/AC conversion section is controlled using a detected angle detected by a resolver provided in an AC electric motor, electric or magnetic noise (hereinafter simply referred to as "switching noise") generated from switching elements provided in the DC/AC conversion section may affect the detected angle detected by the resolver. However, JP 2005-37305 A mentioned above does not mention the effect of such switching noise on the detected angle detected by the resolver, and as a matter of course, does not mention a configuration of the control device made in appropriate consideration of the effect of switching noise on the detected angle detected by the resolver.

SUMMARY OF THE INVENTION

In view of the foregoing, it is desirable to provide a control device configured in appropriate consideration of the effect of switching noise on a detected angle detected by a resolver.

According to an aspect of the present invention, a control device controls an electric motor drive device including a DC/AC conversion section that converts a DC voltage into an AC voltage using a detected angle detected by a resolver provided in an AC electric motor to supply the resulting AC voltage to the AC electric motor. The control device includes: a detected angle acquisition section that acquires a detected angle detected by the resolver; a correction information storage section that stores both first correction information associated with a rotational speed of the AC electric motor and second correction information associated with a modulation rate, which is a ratio of an effective value of a fundamental-wave component of the AC voltage to the DC voltage, as correction information for correcting the detected angle; a correction information acquisition section that acquires the first correction information on the basis of the rotational speed in the case where the rotational speed at an angle acquisition time point when the detected angle acquisition section acquires the detected angle is equal to or more than a rotational speed threshold determined in advance, and that acquires the second correction information on the basis of the modulation rate at the angle acquisition time point in the case where the rotational speed at the angle acquisition time point is less than the rotational speed threshold; and a detected angle correction section that corrects the detected angle on the basis of the correction information acquired by the correction information acquisition section.

In general, an AC electric motor may take various operating points determined by the rotational speed and output torque of the AC electric motor. If the modulation rate of an AC voltage supplied to the AC electric motor is the same, however, the on/off timing of switching elements provided in a DC/AC conversion section with respect to the rotational position of a resolver tends to be similar irrespective of the rotational speed or the output torque. In general, in addition, in the case where the DC/AC conversion section is controlled on the basis of pulse width modulation, the on/off timing of the switching elements is generally set on the basis of a carrier set to a constant frequency. Therefore, the number of switchings per one cycle in terms of electrical angle of the resolver decreases as the rotational speed increases.

The prevent inventors have focused on the relationship between the on/off timing of the switching elements and the modulation rate and the relationship between the number of switchings and the rotational speed described above, and found as follows. That is, in a region in which the rotational speed is low, the detection error of the resolver due to switching noise tends to be similar if the modulation rate is the same. In a region in which the rotational speed is high, on the other hand, the number of switchings per one cycle in terms of electrical angle of the resolver decreases, and therefore switching noise affects the detected angle detected by the resolver to a smaller degree, and the detection error of the resolver tends to be similar if the rotational speed is the same.

The aspect of the present invention has been made on the basis of the findings described above on the effect of switching noise on the detected angle detected by the resolver. According to the aspect described above, it is possible to appropriately correct the detected angle detected by the resolver in many operating states (operating points) while suppressing the amount of data of the correction information for correcting the detected angle detected by the resolver to be small, by providing correction information associated with the rotational speed for operating points at which the rotational speed is equal to or more than the rotational speed threshold, and providing correction information associated with the modulation rate for operating points at which the rotational speed is less than the rotational speed threshold.

Here, information prescribing a correction amount for reducing an error in the detected angle due to an N-th-order error component with a cycle of an N-th part (N is a positive number) of one cycle in terms of electrical angle of the resolver included in the detected angle may be defined as N-th-order error reduction information; both the first correction information and the second correction information may be formed by a single N-th-order error reduction information or formed by superimposing a plurality of pieces of the N-th-order error reduction information on each other; one of the first correction information and the second correction information may be formed on the basis of the N-th-order error reduction information with a specific order that is one or more; and the other of the first correction information and the second correction information may be formed to include the N-th-order error reduction information with an order that is different from the specific order.

According to the configuration, it is possible to appropriately set the correction information with a focus on an error component included in each correction information for both the first correction information and the second correction information. Since each correction information is formed by a single N-th-order error reduction information or formed by superimposing a plurality of pieces of the N-th-order error reduction information on each other, in addition, it is possible to simplify the correction information and hence the configuration of the correction information storage section.

In the configuration in which both the first correction information and the second correction information are formed by a single N-th-order error reduction information or formed by superimposing a plurality of pieces of the N-th-order error reduction information on each other as described above, the first correction information may be formed by first-order error reduction information, and the correction amount prescribed by the first-order error reduction information may be set in accordance with the rotational speed; and the second correction information may be formed by superimposing at least one piece of the N-th-order error reduction information with an order of two or more on the first-order error reduction information, and the correction amount prescribed for each piece of the N-th-order error reduction information including the first-order error reduction information may be set in accordance with the modulation rate.

According to the configuration, it is possible to appropriately set the first correction information, which is used to correct the detected angle in a region in which the rotational speed is equal to or more than the rotational speed threshold, in accordance with the rotational speed in appropriate consideration of the fact that the effect of switching noise is so small that a first-order error component is dominant in such a region. In addition, it is possible to appropriately set the second correction info illation, which is used to correct the detected angle in a region in which the rotational speed is less than the rotational speed threshold, in accordance with the modulation rate in appropriate consideration of the fact that the effect of switching noise is so large that the detected angle detected by the resolver tends to include error components with an order of two or more in such a region.

the control device may further include a switching control section that controls switching elements provided in the DC/AC conversion section. A number of samplings per one cycle of a sinusoidal wave that are necessary to reproduce a shape of the sinusoidal wave in a discrete system may be defined as a sinusoidal-wave reproduction threshold; and the rotational speed threshold may be set to a rotational speed at which a number of switchings of the switching elements per one cycle in terms of electrical angle of the resolver is equal to or more than the sinusoidal-wave reproduction threshold and equal to or less than a value that is twice the sinusoidal-wave reproduction threshold.

According to the configuration, it is possible to appropriately set the rotational speed threshold which serves as the boundary between a region in which the effect of switching noise on the detected angle detected by the resolver is large and a region in which such an effect is small, in view of the findings obtained from the results of experiments conducted by the present inventors that in a rotational speed range in which the number of switchings per one cycle in terms of electrical angle of the resolver is less than the sinusoidal-wave reproduction threshold, it is unlikely that switching noise which appears discretely with respect to the electrical angle causes error components with an order of two or more for the detected angle detected by the resolver.

The technical characteristics of the control device which controls an electric motor drive device according to the present invention configured as described above can be also applied to a detected angle correction method and a detected angle correction program for a control device that controls an electric motor drive device. Therefore, the present invention may also claim such a method and a program.

As a matter of course, such a detected angle correction method and a detected angle correction program for a control device that controls an electric motor drive device can also achieve functions and effects of the control device discussed above, and may further be integrated with several additional technologies given as an example of a preferable configuration of the control device.

DETAILED DESCRIPTION OF THE EMBODIMENTS

Figure 1:
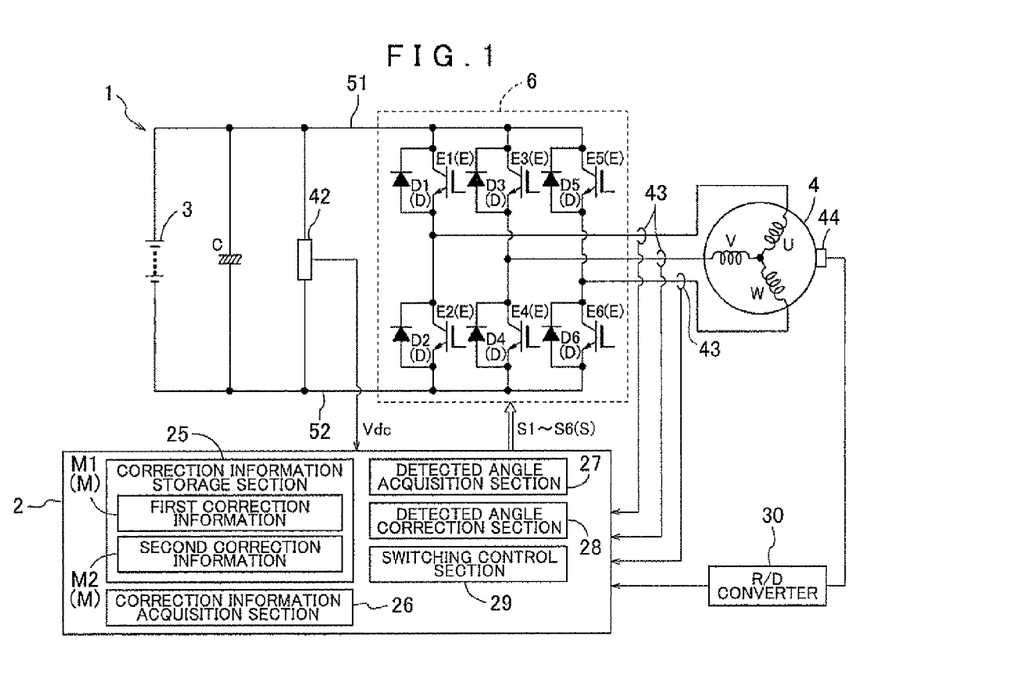
FIG. 1 shows the configuration of a control device according to an embodiment of the present invention.

A control device according to an embodiment of the present invention will be described with reference to the drawings. In the embodiment, as shown in FIG. 1, an electric motor drive device 1 to be controlled by a control device 2 is configured as a device that drives an interior permanent magnet synchronous motor 4 (IPMSM, hereinafter simply referred to as "electric motor 4") which is an AC motor that operates on three-phase AC. The electric motor 4 includes a resolver 44. The control device 2 controls the electric motor drive device 1 using a detected angle θ detected by the resolver 44 such that the electric motor 4 achieves a desired operating state (operating point). In this event, the detected angle θ detected by the resolver 44 is corrected on the basis of correction information M provided in a correction information storage section 25.

In such a configuration, in the embodiment, the correction information M includes first correction information M1 (see FIG. 8) associated with a rotational speed ω of the electric motor 4, and second correction information M2 (see FIG. 9) associated with a modulation rate R. The control device 2 according to the embodiment is characterized by correcting the detected angle θ using the first correction information M1 in the case where the rotational speed ω is equal to or more than a rotational speed threshold ω0 (see FIG. 7), and by correcting the detected angle θ using the second correction information M2 in the case where the rotational speed ω is less than the rotational speed threshold ω0. This makes it possible to appropriately correct the detected angle θ in accordance with the operating state (operating point) of the electric motor 4 while suppressing the amount of data of the correction information M for correcting the detected angle θ to be small. The configuration of the control device 2 according to the embodiment will be described in detail below.

1. Overall Configuration of Electric Motor Drive Device

First, the overall configuration of the electric motor drive device 1 to be controlled by the control device 2 according to the embodiment will be described with reference to FIG. 1. The electric motor drive device 1 includes an inverter 6, a DC power source 3, and a smoothing capacitor C. The inverter 6 is a device that converts a system voltage Vdc, which is a DC voltage supplied from the DC power source 3, into an AC voltage to supply the resulting AC voltage to the electric motor 4. The system voltage Vdc supplied from the DC power source 3 is smoothed by the smoothing capacitor C. As the DC power source 3, various types of secondary batteries such as nickel-hydrogen secondary batteries and lithium-ion secondary batteries, capacitors, or a combination thereof, for example, may be used. In the embodiment, the power source voltage of the DC power source 3 is not boosted or lowered but supplied as it is as the system voltage Vdc. The system voltage Vdc is detected by a system voltage sensor 42 to be output to the control device 2. In the embodiment, the inverter 6 corresponds to the "DC/AC conversion section" according to the present invention.

The inverter 6 includes a plurality of sets of a switching element E and a diode D. In the embodiment, the inverter 6 includes a pair of switching elements E for each of the respective phases (three phases, namely U phase, V phase, and W phase) of the electric motor 4, that is, six switching elements E. Specifically, the inverter 6 includes a U-phase upper arm element E1 and a U-phase lower arm element E2, a V-phase upper arm element E3 and a V-phase lower arm element E4, and a W-phase upper arm element E5 and a W-phase lower arm element E6 as the switching elements E. The diodes D1 to D6, each of which functions as a free wheel diode, is connected in parallel with the switching elements E1 to E6, respectively.

As shown in FIG. 1, the emitters of the upper arm elements E1, E3, and E5 for the respective phases and the collectors of the lower arm elements E2, E4, and E6 for the respective phases are connected to the coils of the electric motor 4 for the respective phases. The collectors of the upper arm elements E1, E3, and E5 for the respective phases are connected to a system voltage line 51. The emitters of the lower arm elements E2, E4, and E6 for the respective phases are connected to a negative electrode line 52. In the embodiment, the switching elements E are insulated gate bipolar transistors (IGBTs). As the switching elements E, power transistors of various structures such as a bipolar type, a field-effect type, and a MOS type may be used besides IGBTs.

The switching elements E operate to turn on and off in accordance with switching control signals S output from the control device 2. The switching control signals S include six switching control signals S1 to S6 corresponding to the switching elements E1 to E6, respectively, and are gate drive signals for driving the gates. The inverter 6 converts the system voltage Vdc into an AC voltage corresponding to the switching control signals S to supply the resulting AC voltage to the electric motor 4 in order to cause the electric motor 4 to output torque TM matching target torque. In the embodiment, the electric motor 4 is configured to operate also as an electric generator as necessary. Such an electric motor 4 is used as a drive force source for an electric vehicle, a hybrid vehicle, or the like, for example. When the electric motor 4 functions as an electric generator, the inverter 6 converts the generated AC voltage into a DC voltage to supply the resulting DC voltage to the system voltage line 51.

In the embodiment, the switching elements E perform switching operation in accordance with the switching control signals S under pulse width modulation (PWM) control or rectangular-wave control. In the PWM control, the duty ratio of each pulse is controlled such that a PWM waveform, which is the output voltage waveform of the inverter 6 for each of U phase, V phase, and W phase, is formed by a collection of pulses forming high-level periods for which the upper arm elements E1, E3, and E5 are turned on and low-level periods for which the lower arm elements E2, E4, and E6 are turned on, and such that a fundamental-wave component of the PWM waveform forms a generally sinusoidal wave in a certain period. Although not described in detail, the control device 2 generates an AC voltage waveform on the basis of an AC voltage command value which is a command value of an AC voltage to be supplied to the electric motor 4, and derives the switching control signals S for generating the PWM waveform described above on the basis of the AC voltage waveform. In the PWM control, the modulation rate R can be varied in the range of "0 to 0.78". Here, the modulation rate R is the ratio of the effective value of the fundamental-wave component of the line-to-line AC voltage (fundamental-wave component of the AC voltage waveform described above) to the DC voltage (system voltage Vdc).

In the rectangular-wave control, on the other hand, rotation synchronization control in which each of the switching elements E is turned on once and turned off once per one cycle in terms of electrical angle of the electric motor 4 and one pulse is output for each phase per half a cycle in terms of electrical angle is performed. Here, the rotation synchronization control is control for synchronizing the cycle of the electrical angle of the electric motor 4 and the switching cycle of the inverter 6 with each other. In the rectangular-wave control, the modulation rate R is fixed at "0.78", which is the maximum modulation rate. In other words, the rectangular-wave control mode is executed when the modulation rate R reaches the maximum modulation rate.

In the embodiment, as control schemes of the PWM control, two control schemes, namely normal PWM control and overmodulation PWM control, are provided so as to be switchable in accordance with the magnitude relationship between the amplitude of the AC voltage waveform and the amplitude of a carrier waveform, and two control schemes, namely three-phase modulation control and two-phase modulation control, are provided so as to be switchable in accordance with the energization state for each phase. The carrier may be a triangular wave, a sawtooth wave, or the like, for example. In the embodiment, the carrier has a constant frequency irrespective of the operating point of the electric motor 4.

The normal PWM control is PWM control in which the amplitude of the AC voltage waveform is equal to or less than the amplitude of the carrier waveform. Such normal PWM control is represented by sinusoidal-wave PWM control. In the embodiment, however, space vector PWM (SVPWM) control in which a neutral point bias voltage is applied to a fundamental wave for each phase for the sinusoidal-wave PWM control is used for the normal PWM control. In the SVPWM control, the PWM waveform is generated directly through digital computation, rather than through comparison with the carrier. Also in that case, during execution of the normal PWM control, the amplitude of the AC voltage waveform is equal to or less than the amplitude of an imaginary carrier waveform. In the present invention, such a scheme in which the PWM waveform is generated without using the carrier is also included in the normal PWM control or the overmodulation PWM control through comparison with the amplitude of an imaginary carrier waveform. In the SVPWM control as the normal PWM control, the modulation rate R can be varied in the range of "0 to 0.707".

The overmodulation PWM control is PWM control in which the amplitude of the AC voltage waveform is more than the amplitude of the carrier waveform. In the overmodulation PWM control, the duty ratio of each pulse is controlled so as to increase at upwardly convex portions of the fundamental-wave component and so as to reduce at downwardly convex portions of the fundamental-wave component compared to that in the normal PWM control such that the waveform of the fundamental-wave component of the output voltage waveform of the inverter 6 is distorted to obtain an amplitude that is larger than that in the normal PWM control. In the overmodulation PWM control, the modulation rate R can be varied in the range of "0.707 to 0.78".

In the three-phase modulation control, control is performed by inputting a PWM signal to each of the three phases, namely U phase, V phase, and W phase. In the two-phase modulation control, on the other hand, a PWM signal is input to each of two phases of the three phases, namely U phase, V phase, and W phase, and an on or off (constant voltage) signal is input to the remaining one phase. Switching noise generated from the switching elements E (electric or magnetic noise) is significantly affected by the number of switchings. Therefore, switching noise can be suppressed during execution of the two-phase modulation control to a greater degree than during execution of the three-phase modulation control. In the embodiment, the three-phase modulation control is executed at operating points at which the modulation rate R is less than "0.6" (to be more exact, "0.61", and the same applies hereinafter), and the two-phase modulation control is executed at operating points at which the modulation rate R is equal to or more than 0.6.

Thus, in the embodiment, the value of the modulation rate R (in the example, "0.6") at which switching is performed between the three-phase modulation control and the two-phase modulation control is set to be smaller than the value of the modulation rate R (in the example, "0.707") at which switching is performed between the normal PWM control and the overmodulation PWM control. However, the former value of the modulation rate R may be set to be the same as the latter value of the modulation rate R, or the former value of the modulation rate R may be set to be larger than the latter value of the modulation rate R. In addition, the modulation rate R at which switching is performed between the normal PWM control and the overmodulation PWM control varies in accordance with the control scheme of the normal PWM control. For example, in the case where the sinusoidal-wave PWM control is used instead of the SVPWM control, the modulation rate R is set to "0.6". Also in this case, the magnitude relationship between the value of the modulation rate R at which switching is performed between the normal PWM control and the overmodulation PWM control and the value of the modulation rate R at which switching is performed between the three-phase modulation control and the two-phase modulation control may be set as desired.

2. Configuration of Control Device

Next, the configuration of the control device 2 according to the embodiment will be described in detail. As shown in FIG. 1, the control device 2 includes a detected angle acquisition section 27, a correction information acquisition section 26, a detected angle correction section 28, and a switching control section 29, and controls the electric motor drive device 1 using the detected angle θ detected by the resolver 44 provided in the electric motor 4. Each functional section of the control device 2 is implemented by hardware, software (a program), or a combination of both that performs various processes on input data using a logic circuit such as a microcomputer as a core member. In addition, the control device 2 includes the correction information storage section 25. The correction information storage section 25 includes as a hardware component a storage medium that can store information, or that can store and rewrite information, such as a hard disk drive or a flash memory, for example. Each functional section provided in the control device 2 will be described in detail below.

2-1. Detected Angle Acquisition Section

The detected angle acquisition section 27 is a functional section that acquires the detected angle θ detected by the resolver 44. The resolver 44 is disposed adjacent to a rotor of the electric motor 4, and provided to detect the rotational position (electrical angle) of the rotor with respect to a stator of the electric motor 4 or the rotational speed ω of the electric motor 4. The rotational position of the rotor represents the rotational angle of the rotor in terms of electrical angle.

The resolver 44 includes a sensor rotor (not shown) and a sensor stator (not shown), and the sensor rotor is disposed so as to rotate together with the rotor of the electric motor 4. This makes it possible to detect the rotational position (electrical angle) of the rotor of the electric motor 4 by processing a signal detected by the resolver 44. In the embodiment, the resolver 44 is a resolver with an angle multiplication factor of "4" (4× resolver), and one cycle of the sensor rotor corresponds to four times of one cycle in terms of electrical angle. That is, an angle signal corresponding to four cycles is output as a result of one rotation of the sensor rotor. The resolver 44 may be a resolver with an angle multiplication factor of other than "4", and may be a resolver with an angle multiplication factor of "1", "2", "8", or the like, for example.

An output signal from the resolver 44 is converted into output signals for three phases, specifically an A-phase signal, a B-phase signal, and a Z-phase signal, by an R/D converter (resolver/digital converter) 30 to be output to the control device 2. That is, the control device 2 receives output signals for the three phases (the A-phase signal, the B-phase signal, and the Z-phase signal) from the R/D converter 30. The detected angle acquisition section 27 derives the detected angle θ detected by the resolver 44 on the basis of such output signals to acquire the detected angle θ. The detected angle θ acquired by the detected angle acquisition section 27 is output to the detected angle correction section 28.

Figure 2:
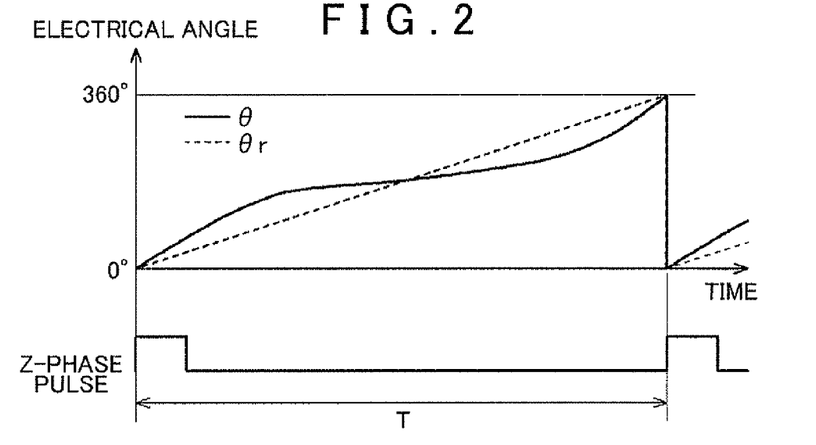
FIG. 2 illustrates a detected angle detected by a resolver and an error in the detected angle.

Here, the procedures for deriving the detected angle θ detected by the resolver 44 executed by the detected angle acquisition section 27 will be illustrated with reference to FIG. 2. FIG. 2 schematically represents a situation in which the rotor of the electric motor 4 is rotating at a constant speed. As shown in FIG. 2, the Z-phase signal is a signal (hereinafter referred to as "Z-phase pulse signal) including pulses (rectangular pulses) output from the R/D converter 30 for each reference angle. In the example, the Z-phase pulse signal is a signal including pulses generated for each control cycle T set to the length of one cycle in terms of electrical angle. In the embodiment, as described above, the resolver 44 is a resolver with an angle multiplication factor of "4". Therefore, one cycle of the rotor of the electric motor 4 (one cycle of the sensor rotor) corresponds to four times of the control cycle T. The electrical angle of the resolver 44 is set with respective rising points of the pulses in the Z-phase pulse signal defined as reference points (zero points). Specifically, the electrical angle is set with a rising point of a pulse in the Z-phase pulse signal defined as "0°" and with a rising point of the next pulse defined as "360°".

The electrical angle may be set on the basis of respective falling points of the pulses. Alternatively, the Z-phase pulse signal may be a signal including pulses generated for each cycle of the sensor rotor, that is, for each cycle in terms of mechanical angle. Also in such a configuration, the electrical angle of "0°" may be set in the same manner as described above on the basis of rising points or falling points of the pulses and the angle multiplication factor.

Although not shown, the A-phase signal and the B-phase signal are rectangular-wave signals including pulses generated in predetermined extremely short cycles. The A-phase signal and the B-phase signal have a predetermined phase difference (for example, a phase difference of 90°) between each other. The A-phase signal and the B-phase signal are set so as to include a predetermined number of pulses within one cycle (control cycle T) of the Z-phase pulse signal. Therefore, the rotational position (electrical angle) at each time point may be obtained by counting pulses that appear in the A-phase signal or the B-phase signal during a period from the reference point (zero point) in the Z-phase pulse signal described above to that time point. For example, assuming a case where 1024 pulses are included in each of the A-phase signal and the B-phase signal within the control cycle T, in the case where n pulses appear in the A-phase signal or the B-phase signal during a period from a reference point (zero point) in the Z-phase pulse signal to a certain time point, the rotational position (rotational phase) at that time point corresponds to an electrical angle of the value of "(360°/1024)×n". Because the A-phase signal and the B-phase signal have a predetermined phase difference between each other, the rotational direction of the rotor of the electric motor 4 can be judged on the basis of the output order of such pulses.

The detected angle acquisition section 27 derives the electrical angle of the sensor rotor of the resolver 44 by counting pulses included in the A-phase signal or the B-phase signal as described above. In the example, the zero point in terms of electrical angle of the resolver 44 and the zero point in terms of electrical angle of the electric motor 4 are set so as to match each other. Therefore, the electrical angle of the sensor rotor of the resolver 44 as it is corresponds to the electrical angle of the rotor of the electric motor 4.

FIG. 2 shows an example of the detected angle θ detected by the resolver 44 derived as described above by the detected angle acquisition section 27. The broken line in FIG. 2 indicates a true electrical angle θr of the sensor rotor of the resolver 44 in this case. Here, since a situation in which the rotor of the electric motor 4 is rotating at a constant speed is assumed as described above, the true electrical angle θr is increased uniformly along with an increase of the time, and represented by a straight line such as that shown in FIG. 2. On the other hand, the detected angle θ is generally subjected to an error, and deviates from the true electrical angle θr. In the example shown in FIG. 2, the detected angle θ is larger than the true electrical angle θr before a certain time within the control cycle T (specifically, an intermediate point within the control cycle T), and the detected angle θ is smaller than the true electrical angle θr at and after the certain time.

The error in the detected angle θ includes an error due to the structure or the properties of the resolver 44, and an error due to the environment around the resolver 44. Examples of the error due to the structure or the properties of the resolver 44 include an error due to non-uniform winding or an assembly error of a coil provided in the resolver 44. In general, such an error is included in the detected angle θ as a first-order error component (to be discussed in detail later).

Meanwhile, examples of the error due to the environment around the resolver 44 include an error due to switching noise generated from the switching elements E (E1 to E6) provided in the inverter 6, an error due to leakage flux from the electric motor 4, and so forth. The error due to switching noise may be caused when high-frequency noise generated from the switching elements E reaches the resolver 44 to affect an output signal output from the resolver 44, for example. The error due to switching noise may also be caused when high-frequency noise generated from the switching elements E (E1 to E6) reaches any location in a path from the resolver 44 to the control device 2 through the R/D converter 30 to affect a signal passing through an element or wiring disposed at the location.

In general, the error included in the detected angle θ may be represented by a sinusoidal wave with a cycle of an N-th part (N is a positive number, and is hereinafter occasionally referred to as "order") of one cycle (control cycle T) in terms of electrical angle of the resolver 44, or by the sum of a plurality of sinusoidal waves with different orders. For example, in the example shown in FIG. 2, the error included in the detected angle θ may be represented by a first-order sinusoidal wave (that is, with an order of "1", and the same applies hereinafter). In the following description, an error component represented by an N-th-order sinusoidal wave is referred to as "N-th-order error component". The correction information M for correcting the N-th-order error component is also represented by an N-th-order sinusoidal wave. In the following description, the correction information M for reducing an error in the detected angle θ due to the N-th-order error component is referred to as "N-th-order error reduction information L[N]". The N-th-order error reduction information L[N] forming the correction information M (the first correction information M1 and the second correction information M2) may also include N-th-order error reduction information L[N] with an order N with a decimal (such as a pure decimal such as "0.5" and a mixed decimal such as "1.5", for example) besides an order N of a natural number. Alternatively, the N-th-order error reduction information L[N] forming the correction information M (the first correction information M1 and the second correction information M2) may include only N-th-order error reduction information L[N] with an order N of a natural number.

Figure 3:
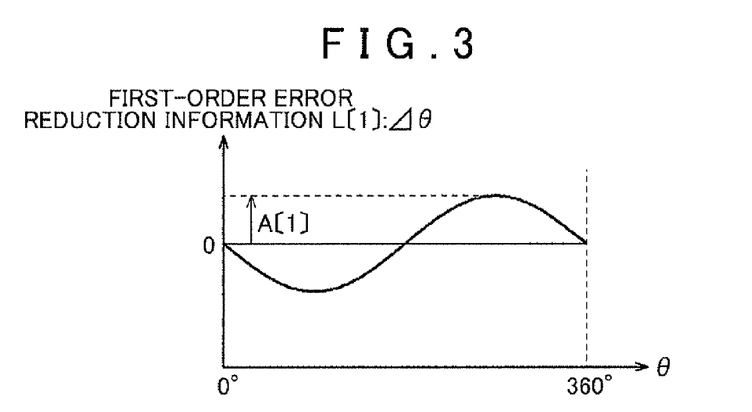
FIG. 3 shows the concept of first-order error reduction information.
Figure 4:
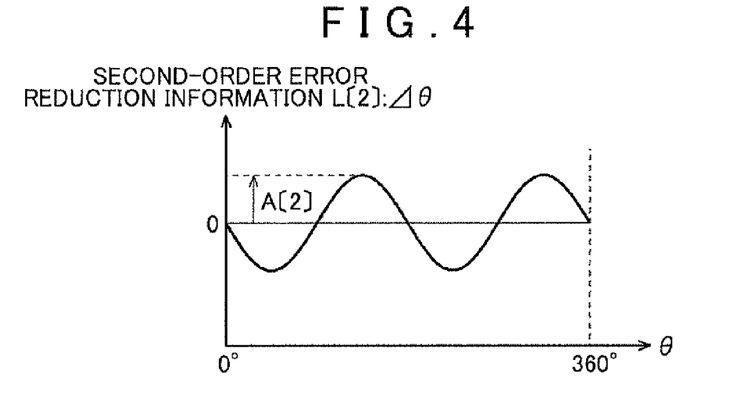
FIG. 4 shows the concept of second-order error reduction information.
Figure 5:
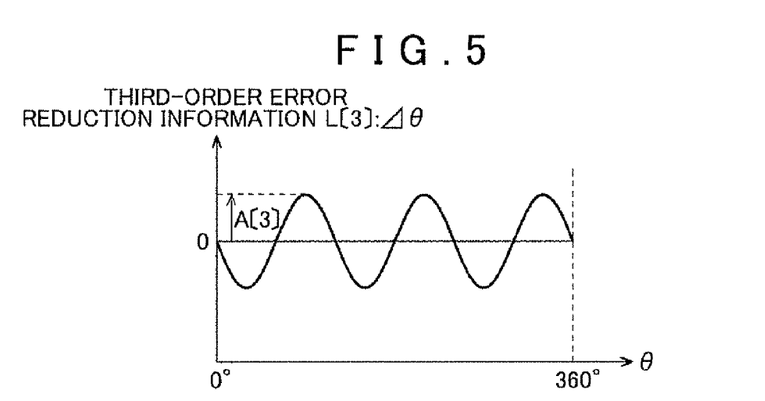
FIG. 5 shows the concept of third-order error reduction information.

FIGS. 3, 4, and 5 schematically represent first-order error reduction information L[1], second-order error reduction information L[2], and third-order error reduction information L[3], respectively. In the drawings, the horizontal axis indicates the detected angle θ, and the vertical axis indicates a correction value Δθ. In the example, the correction value Δθ is prescribed to have a negative value in the case where the detected angle θ is larger than the true electrical angle θr, and the detected angle θ is corrected by adding the correction value Δθ to the detected angle θ. The degree of correction performed using the N-th-order error reduction information L[N] is such that the N-th-order error reduction information L[N] corresponds to an amplitude A[N] of a sinusoidal wave prescribed to reduce an error due to the N-th-order error component. That is, in the embodiment, the amplitude A[N] corresponds to the "correction amount" according to the present invention. The amplitude A[N] may have a negative value. For example, in the case where the amplitude A[N] has a negative value in the first-order error reduction information L[1] shown in FIG. 3, the correction information M is obtained by vertically inverting the sinusoidal wave shown in FIG. 3. The same applies to the N-th-order error reduction information L[N] with other orders.

Here, the detected angle acquisition section 27 derives the detected angle θ detected by the resolver 44 on the basis of output signals for the three phases (A-phase signal, B-phase signal, and Z-phase signal) input from the R/D converter 30 to acquire the detected angle θ. However, the R/D converter 30 or a device provided in accompaniment to the R/D converter 30 may derive the detected angle θ detected by the resolver 44, and the detected angle acquisition section 27 may acquire the detected angle θ, for example.

2-2. Correction Information Storage Section

The correction information storage section 25 stores the correction information M for correcting the detected angle θ detected by the resolver 44. Specifically, the correction information storage section 25 stores both the first correction information M1 associated with the rotational speed ω of the electric motor 4 and the second correction information M2 associated with the modulation rate R as the correction information M. In the embodiment, the correction information M is information prescribing the correction value Δθ for the detected angle θ. As discussed later, in the case where the rotational speed ω of the electric motor 4 at the time point when the detected angle acquisition section 27 acquires the detected angle θ (hereinafter referred to as "angle acquisition time point") is equal to or more than the rotational speed threshold ω0 determined in advance, the detected angle θ is corrected on the basis of the first correction information M1. In the case where the rotational speed ω of the electric motor 4 at the angle acquisition time point is less than the rotational speed threshold ω0, the detected angle θ is corrected on the basis of the second correction information M2.

Figure 6:
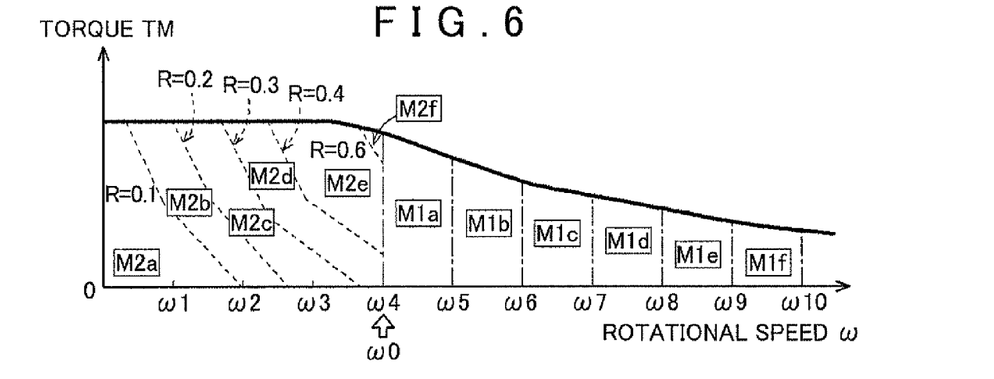
FIG. 6 shows the concept of a correction information map provided in a correction information storage section according to the embodiment of the present invention.

In the embodiment, as conceptually shown in FIG. 6, the correction information M is stored in the correction information storage section 25 in the form of a map (hereinafter referred to as "correction information map"). In the example shown in FIG. 6, the rotational speed threshold ω0 described above is set to ω4, the first correction information M1 (M1a to M1f) is assigned to an operating point range equal to or more than the rotational speed threshold ω0, and the second correction information M2 (M2a to M2f) is assigned to an operating point range less than the rotational speed threshold ω0. Thus, the correction information map includes a first correction information map prescribing the first correction information M1 in association with the rotational speed ω, and a second correction information map prescribing the second correction information M2 in association with the modulation rate R.

2-2-1. First Correction Information Map

Figure 8:
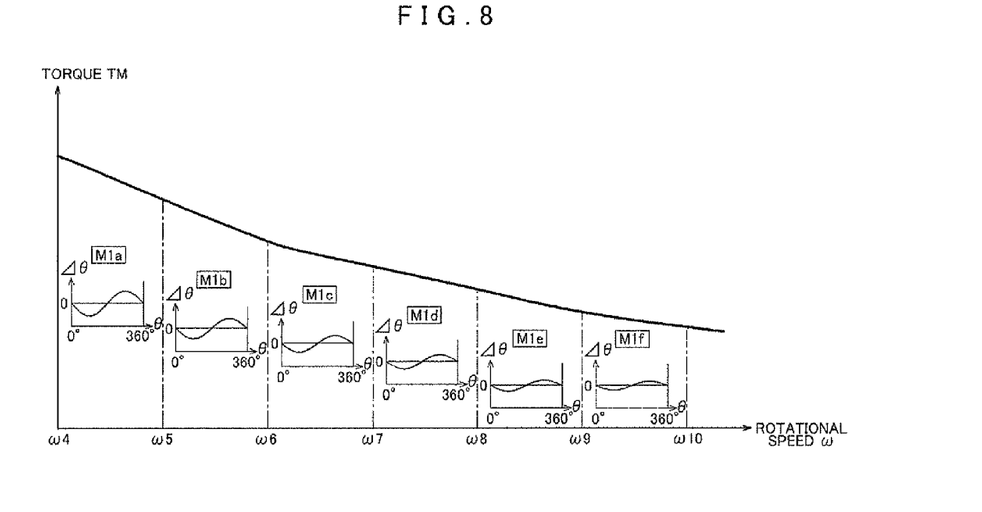
FIG. 8 shows the concept of a first correction information map provided in the correction information storage section according to the embodiment of the present invention.

As shown in FIG. 8, the first correction information map prescribes the first correction information M1 for each of a plurality of rotational speed ranges set by dividing the range of values that the rotational speed ω may take into a plurality of regions. In the embodiment, the first correction information M1 is formed by the first-order error reduction information L[1] such as that shown in FIG. 3, and the correction amount (in the example, amplitude A[1]) prescribed by the first-order error reduction information L[1] is set in accordance with the rotational speed ω. That is, the first correction information M1 is formed on the basis of N-th-order error reduction information for the first order (first-order error reduction information L[1]). In the embodiment, the "specific order" according to the present invention is "1". In the example shown in FIG. 8, the amplitude A[1] prescribed by the first-order error reduction information L[1] decreases as the rotational speed ω increases. Specifically, M1a, M1b, M1c, M1d, M1e, and M1f of the first correction information M1 are assigned from the lower side toward the higher side of the rotational speed ω, and the amplitude A[1] prescribed by the first-order error reduction information L[1] forming the first correction information M1 is set so as to decrease in the order of M1a, M1b, M1c, M1d, M1e, and M1f.

The relationship between the amplitude A[1] prescribed by the first-order error reduction information L[1] and the rotational speed ω may be changed appropriately in accordance with the structure or the properties of the resolver 44 or the R/D converter 30. For example, the amplitude A[1] prescribed by the first-order error reduction information L[1] may be set so as to increase as the rotational speed ω increases. Alternatively, the amplitude A[1] prescribed by the first-order error reduction information L[1] may be set so as to increase as the rotational speed ω increases to a predetermined rotational speed ω, and so as to decrease as the rotational speed ω increases after the predetermined rotational speed ω is exceeded. Still alternatively, the amplitude A[1] prescribed by the first-order error reduction information L[1] may be set to a constant value irrespective of the rotational speed ω in at least a part of the rotational speed range.

The first correction information M1 associated with the rotational speed ω is provided on the basis of the findings obtained through diligent studies conducted by the present inventors, that in a rotational speed range in which the first correction information M1 is used to correct the detected angle θ (region in which the rotational speed ω is equal to or more than the rotational speed threshold ω0), the error included in the detected angle θ tends to be similar, even for different values of the torque TM, if the rotational speed ω is the same. That is, in such a rotational speed range, the difference between one cycle (control cycle T) in terms of electrical angle of the resolver 44 and the cycle of an excitation signal (for example, a signal at 10 [kHz] or 20 [kHz]) for exciting the resolver 44 is smaller than a region in which the rotational speed ω is lower, and therefore the rotational speed ω is more dominant than the torque TM in affecting the error included in the detected angle θ.

2-2-2. Second Correction Information Map

Figure 9:
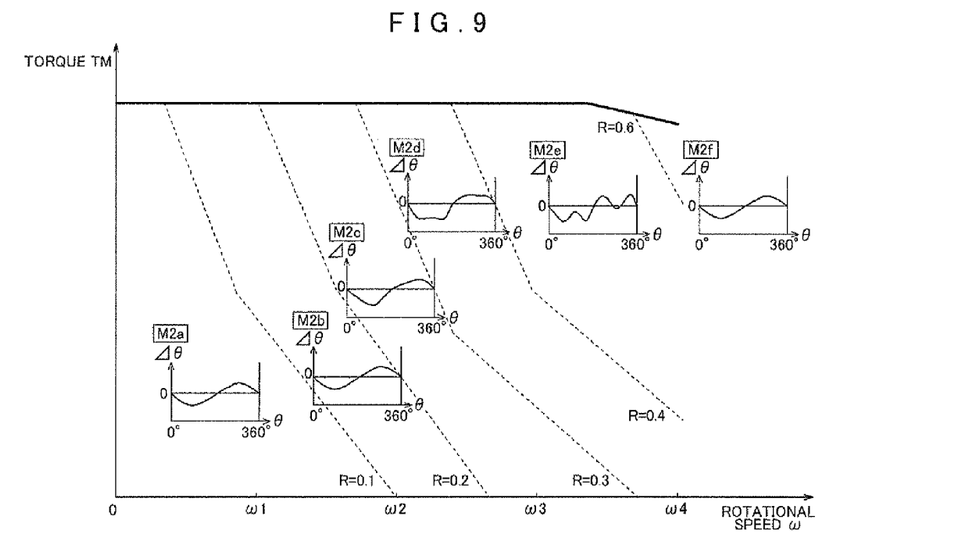
FIG. 9 shows the concept of a second correction information map provided in the correction information storage section according to the embodiment of the present invention.

As shown in FIG. 9, the second correction information map prescribes the second correction information M2 for each of a plurality of modulation rate ranges set by dividing the range of values that the modulation rate R may take into a plurality of regions. In the embodiment, as shown in FIG. 9, the range of values that the modulation rate R may take are divided into six regions to set sex modulation rate ranges. Specifically, the set six modulation rate ranges include a region in which the modulation rate R is less than 0.1 (hereinafter referred to as "first modulation rate range"), a region in which the modulation rate R is equal to or more than 0.1 and less than 0.2 (hereinafter referred to as "second modulation rate range"), a region in which the modulation rate R is equal to or more than 0.2 and less than 0.3 (hereinafter referred to as "third modulation rate range"), a region in which the modulation rate R is equal to or more than 0.3 and less than 0.4 (hereinafter referred to as "fourth modulation rate range"), a region in which the modulation rate R is equal to or more than 0.4 and less than 0.6 (hereinafter referred to as "fifth modulation rate range"), and a region in which the modulation rate R is equal to or more than 0.6 (hereinafter referred to as "sixth modulation rate range"). To the thus set modulation rate ranges, M2$a$, M2$b$, M2$c$, M2$d$, M2$e$, and M2$f$ of the second correction information M2 are assigned from the lower side toward the higher side of the modulation rate R.

In the embodiment, the second correction information M2 is formed by superimposing at least one piece of the N-th-order error reduction information L[N] with an order of two or more on the first-order error reduction information L[1], and the correction amount (in the example, amplitude A[N]) prescribed for each piece of the N-th-order error reduction information L[N] including the first-order error reduction information L[1] is set in accordance with the modulation rate R. The correction amount (A[N]) can be set to zero. That is, in the embodiment, the second correction information M2 is formed to include the N-th-order error reduction information L[N] with an order that is different from the specific order (in the example, "1").

In the embodiment, as shown in FIG. 9, in the second correction information M2 assigned to the first modulation rate range, the second modulation rate range, and the sixth modulation rate range, the first-order error reduction information L[1] is dominant, and the amplitude A[1] prescribed by the first-order error reduction information L[1] is set to be larger than the amplitude A[N] prescribed by the N-th-order error reduction information L[N] with an order of two or more. In the second correction information M2 assigned to the third modulation rate range, the fourth modulation rate range, and the fifth modulation rate range, on the other hand, not only the correction amount (A[1]) prescribed by the first-order error reduction information L[1] but also the correction amount (A[N]) prescribed by the N-th-order error reduction information L[N] with an order of two or more is set to have a significant value.

Specifically, as the modulation rate R is varied from 0 toward 0.6, a waveform representing the second correction information M2 is distorted to an increasingly greater degree. This means that as the modulation rate R is varied from 0 toward 0.6, the on/off timing of the switching elements E with reference to the rotational position of the resolver 44 is varied so as to increase the effect of switching noise on the value detected by the resolver 44. When the modulation rate R is equal to or more than 0.6, on the other hand, the waveform is distorted to a smaller degree. This is because in a region in which the modulation rate R is equal to or more than 0.6, the PWM control by the two-phase modulation control scheme or the rectangular-wave control is performed as described above, and therefore the number of times that the switching elements E are turned on and off is suppressed to reduce the effect of switching noise on the value detected by the resolver 44.

The second correction information M2 associated with the modulation rate R is provided on the basis of the findings obtained through diligent studies conducted by the present inventors, that in a rotational speed range in which the second correction information M2 is used to correct the detected angle θ (region in which the rotational speed ω is less than the rotational speed threshold ω0), the on/off timing of the switching elements E with respect to the rotational position of the resolver 44 tends to be similar and therefore the error included in the detected angle θ tends to be similar, even for different values of the torque TM or the rotational speed ω, if the modulation rate R is the same.

The first correction information map and the second correction information map may be prepared through a test, a simulation, and so forth, and may be stored in the correction information storage section 25 during manufacture of the control device 2, for example. In addition, correction information may be learned during control of the electric motor drive device 1 by the control device 2 to update a correction value map stored in advance in the correction information storage section 25 or create a new correction value map. Such a configuration in which correction information is learned during control of the electric motor drive device 1 by the control device 2 is particularly effective in the case where components forming the resolver 44, the R/D converter 30, the control device 2, or the like are subjected to secular deterioration or the like, for example.

2-2-3. Setting of Rotational Speed Threshold

Figure 7:
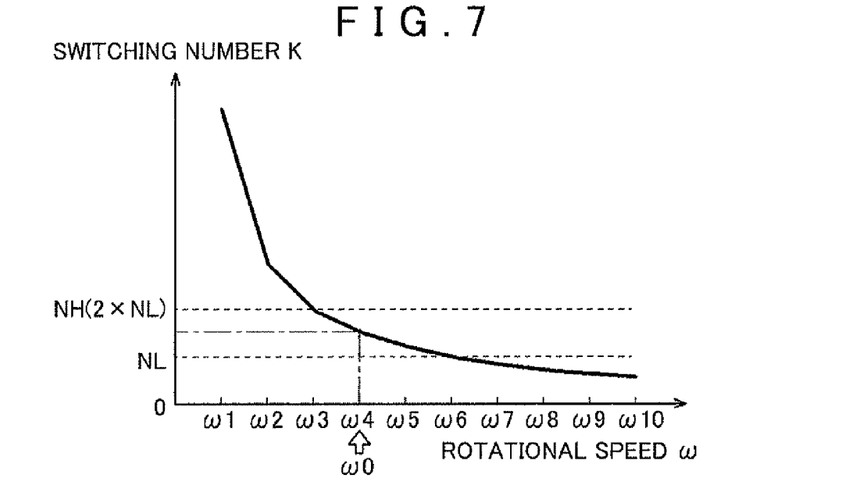
FIG. 7 illustrates setting of a rotational speed threshold according to the embodiment of the present invention.

Here, setting of the rotational speed threshold ω0 will be described with reference to FIG. 7. FIG. 7 is a graph showing variations in the number of switchings K of the switching elements E per one cycle in terms of electrical angle of the resolver 44 (hereinafter simply referred to as "switching number K" in this section) with respect to the rotational speed ω during execution of the PWM control. As shown in the drawing, the switching number K decreases quadratically as the rotational speed ω increases, and the rate of variation of the switching number K with respect to the rotational speed ω is higher in a region in which the rotational speed ω is lower, and lower in a region in which the rotational speed ω is higher. The switching frequency of the switching elements E during execution of the PWM control is twice the carrier frequency. The switching number K mentioned here is determined on the basis of the number of switchings corresponding to the switching frequency. The switching number K mentioned here is the number of only switchings that cause an error to the detected angle θ, and generally coincides with the number of switchings corresponding to the switching frequency.

The error components with an order of two or more included in the error in the detected angle θ are mainly due to switching noise. As a result of diligent studies, the present inventors have found that in a rotational speed range in which the switching number K is equal to or less than a predetermined value, the switching number K is so small that only the first-order error component is substantially included in the detected angle θ. In the embodiment, in view of such findings, the rotational speed ω (in the example, ω4) at which the switching number K has such a predetermined value is set as the rotational speed threshold ω0, and the first correction information M1 used in a region in which the rotational speed ω is equal to or more than the rotational speed threshold ω0 is formed by the first-order error reduction information L[1]. As shown in FIG. 7, the rotational speed threshold ω0 is roughly positioned near the boundary between a rotational speed range in which the rate of variation of the switching number K with respect to the rotational speed ω is high and a rotational speed range in which such a rate of variation is low.

More specifically, in the embodiment, as shown in FIG. 7, the rotational speed threshold ω0 is set to the rotational speed ω at which the switching number K is equal to or more than a sinusoidal-wave reproduction threshold NL and equal to or less than a value (NH) that is twice the sinusoidal-wave reproduction threshold NL. Here, the sinusoidal-wave reproduction threshold NL is the number of samplings per one cycle of a sinusoidal wave that are necessary to reproduce the shape of the sinusoidal wave in a discrete system. In other words, the sinusoidal-wave reproduction threshold NL is the number of samplings per one cycle of a sinusoidal wave enough to reproduce the shape of the sinusoidal wave in a discrete system. The sinusoidal-wave reproduction threshold NL may be "10" or "12", for example. The rotational speed ω corresponding to the sinusoidal-wave reproduction threshold NL is determined in accordance with the number of pairs of magnetic poles for the electric motor 4, the angle multiplication factor of the resolver 44, the switching frequency (carrier frequency), or the like.

The rotational speed threshold ω0 is thus set on the basis of the sinusoidal-wave reproduction threshold NL because in view of the results of experiments conducted by the present inventors, in a rotational speed range in which the switching number K is less than the sinusoidal-wave reproduction threshold NL, it is unlikely that switching noise which appears discretely with respect to the electrical angle causes significant error components with an order of two or more for the detected angle ω.

In the embodiment, as shown in FIG. 7, the rotational speed threshold ω0 is set to the rotational speed ω (in the example, ω4) at which the switching number K is an intermediate value between the sinusoidal-wave reproduction threshold NL and the value (NH) that is twice the sinusoidal-wave reproduction threshold NL. However, the rotational speed threshold ω0 can be set to the rotational speed ω at which the switching number K is equal to the sinusoidal-wave reproduction threshold NL or the value (NH) that is twice the sinusoidal-wave reproduction threshold NL.

2-3. Correction Information Acquisition Section

The correction information acquisition section 26 is a functional section that acquires the correction information M from the correction information storage section 25 in accordance with the operating point of the electric motor 4. Specifically, the correction information acquisition section 26 determines whether or not the rotational speed ω at the time point (angle acquisition time point) when the detected angle acquisition section 27 acquires the detected angle θ is equal to or more than the rotational speed threshold ω0 determined in advance. In the case where the rotational speed ω at the angle acquisition time point is equal to or more than the rotational speed threshold ω0, the correction information acquisition section 26 acquires the first correction information M1 on the basis of the rotational speed ω. In the case where the rotational speed ω at the angle acquisition time point is less than the rotational speed threshold ω0, the correction information acquisition section 26 acquires the second correction information M2 on the basis of the modulation rate R. The correction information M acquired by the correction information acquisition section 26 is output to the detected angle correction section 28.

In the embodiment, as described above, the correction information M is stored in the correction information storage section 25 in the form of a map. In the case where the rotational speed ω at the angle acquisition time point is equal to or more than the rotational speed threshold ω0, the correction information acquisition section 26 references the first correction information map (FIG. 8) provided in the correction information storage section 25 to acquire the first correction information M1 associated with the rotational speed range including the rotational speed ω.

In the case where the rotational speed ω at the angle acquisition time point is less than the rotational speed threshold ω0, on the other hand, the correction information acquisition section 26 references the second correction information map (FIG. 9) provided in the correction information storage section 25 to acquire the second correction information M2 associated with the modulation rate range including the modulation rate R at the angle acquisition time point.

Although not described in detail, the control device 2 includes a functional section (modulation rate derivation section) that derives the modulation rate R, and the modulation rate R derived by the modulation rate derivation section is output to the correction information acquisition section 26 when the correction information acquisition section 26 acquires the second correction information M2.

In the embodiment, the detected angle acquisition section 27 acquires the detected angle θ detected by the resolver 44 and the rotational speed ω of the electric motor 4, and the rotational speed ω acquired by the detected angle acquisition section 27 is output to the correction information acquisition section 26 to allow the correction information acquisition section 26 to acquire the rotational speed ω at the angle acquisition time point. The detected angle acquisition section 27 derives the rotational speed ω of the electric motor 4 on the basis of temporal variations in the acquired detected angle θ (that is, a differential value of the detected angle θ), the time interval between Z-phase pulses, or the like, for example, to acquire the rotational speed ω.

2-4. Detected Angle Correction Section

The detected angle correction section 28 is a functional section that corrects the detected angle θ on the basis of the correction information M acquired by the correction information acquisition section 26. In the embodiment, as described above, the correction information M is information prescribing the correction value Δθ for the detected angle θ, and the correction value Δθ is prescribed to have a negative value in the case where the detected angle θ is larger than the true electrical angle θr. Hence, the detected angle correction section 28 corrects the detected angle θ by adding Δθ to θ on the basis of the detected angle θ input from the detected angle acquisition section 27 and the correction value Δθ prescribed by the correction information M input from the correction information acquisition section 26. The detected angle θ after being corrected is output to the switching control section 29.

2-5. Switching Control Section

The switching control section 29 is a functional section that controls the switching elements E provided in the inverter 6. Specifically, the switching control section 29 generates the switching control signals S (S1 to S6) for switching the switching elements E. In this event, the switching control section 29 generates the switching control signals S on the basis of the detected angle θ after being corrected input from the detected angle correction section 28, the values of currents for three phases (U phase, V phase, and W phase), required torque TM, and so forth.

As shown in FIG. 1, the values of currents for the respective phases flowing between the inverter 6 and the coils for the respective phases of the electric motor 4 are detected by current sensors 43 to be input to the control device 2. Here, the values of currents for the respective phases, namely U phase, V phase, and W phase, are detected by the current sensors 43. However, the currents for the three phases are balanced, and the total sum of the currents is zero. Hence, the values of currents for two phases, of the three phases, may be detected by the current sensors 43, and the value of a current for the remaining one phase may be obtained through computation.

3. Procedures of Detected Angle Correction Process

Figure 10:
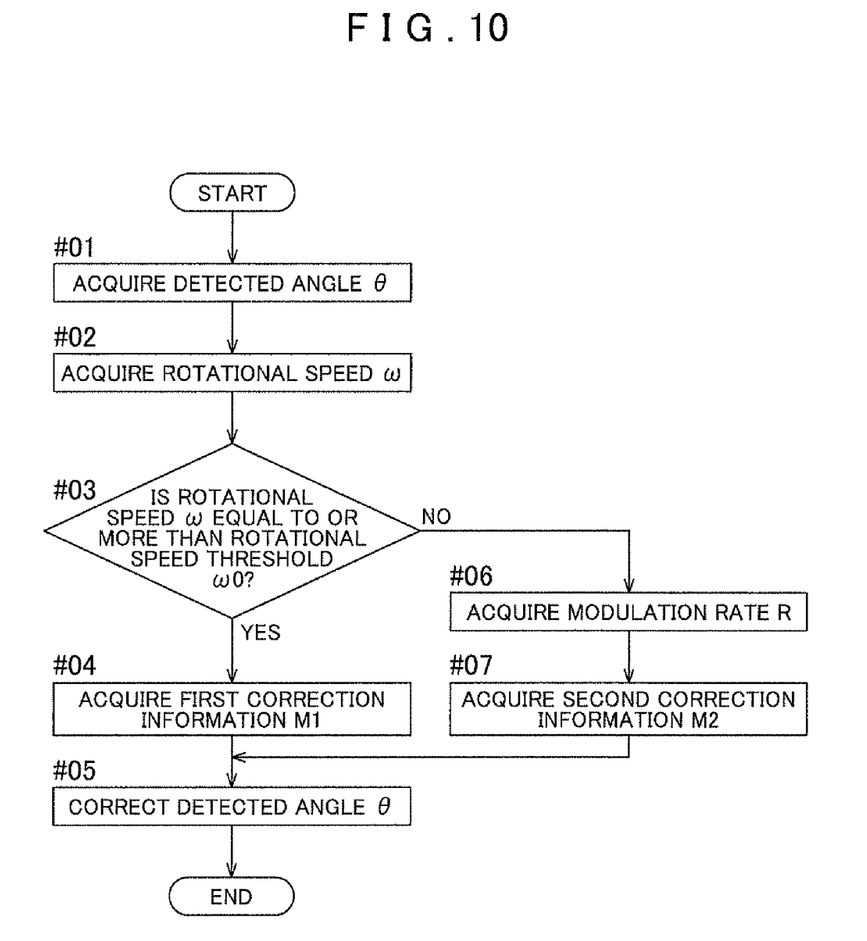
FIG. 10 is a flowchart showing the procedures of a detected angle correction process according to the embodiment of the present invention.

Next, the procedures of a detected angle correction process (detected angle correction method) executed by the control device 2 according to the embodiment will be described with reference to FIG. 10. The procedures of the detected angle correction process described below are executed by hardware or software (a program) implementing the functional sections (the detected angle acquisition section 27, the correction information acquisition section 26, and the detected angle correction section 28) described above provided in the control device 2, or a combination of both. In the case where the functional sections described above are implemented by a program, the arithmetic processing unit provided in the control device 2 operates as a computer that executes the program implementing the functional sections.

First, the detected angle acquisition section 27 acquires a detected angle θ detected by the resolver 44 (step #01), and acquires a rotational speed ω of the electric motor 4 at the time point (angle acquisition time point) when the detected angle θ is acquired (step #02). In the case where the rotational speed ω is equal to or more than the rotational speed threshold ω0 (step #03: Yes), the correction information acquisition section 26 acquires first correction information M1 from the correction information storage section 25 on the basis of the rotational speed ω (step #04). The detected angle correction section 28 corrects the detected angle θ acquired by the detected angle acquisition section 27 on the basis of the first correction information M1 acquired by the correction information acquisition section 26 (step #05).

In the case where the rotational speed ω at the time point (angle acquisition time point) when the detected angle θ is acquired is not equal to or more than the rotational speed threshold ω0 (step #03: No), the correction information acquisition section 26 acquires a modulation rate R (step #06), and acquires second correction information M2 from the correction information storage section 25 on the basis of the modulation rate R (step #07). The detected angle correction section 28 corrects the detected angle θ acquired by the detected angle acquisition section 27 on the basis of the second correction information M2 acquired by the correction information acquisition section 26 (step #05).

In the processes in step #04 and step #07, the same correction information M may be acquired again depending on the value of the rotational speed ω or the modulation rate R. In such a case, the previously acquired correction information M may be utilized as it is without acquiring the correction information M again, or the same correction information M may be acquired again.

4. Other Embodiments

Lastly, other embodiments of the present invention will be described. The characteristics disclosed in each of the following embodiments are not only applicable to that particular embodiment but also to any other embodiment unless any contradiction occurs.

(1) In the embodiment described above, the carrier frequency is constant irrespective of the operating point of the electric motor 4. However, the present invention is not limited thereto. The carrier frequency may be switched in accordance with the operating point of the electric motor 4 etc. determined in accordance with the torque TM, the rotational speed ω, etc. In such a configuration, in view of the fact that the sinusoidal-wave reproduction threshold NL varies together with the carrier frequency, different rotational speed thresholds ω0 may be set for a plurality of carrier frequencies, and a plurality of correction information maps (a first correction information map and a second correction information map) corresponding to the carrier frequencies may be provided. That is, a plurality of rotational speed thresholds ω0 and correction information maps may be provided. In such a configuration, the carrier frequency at the angle acquisition time point may be input to the correction information acquisition section 26, and the correction information acquisition section 26 may perform the same process as in the embodiment described above on the basis of the rotational speed threshold ω0 and the correction information map corresponding to the carrier frequency.

(2) In the embodiment described above, the rotational speed threshold ω0 is set to the rotational speed ω at which the number of switchings K of the switching elements E per one cycle in terms of electrical angle of the resolver 44 is equal to or more than the sinusoidal-wave reproduction threshold NL and equal to or less than the value NH that is twice the sinusoidal-wave reproduction threshold NL. However, the present invention is not limited thereto. The rotational speed threshold ω0 may be set irrespective of the sinusoidal-wave reproduction threshold NL, or in accordance with not only the sinusoidal-wave reproduction threshold NL but also the properties (such as the clock frequency or a coefficient of a transfer function related to an angle computation loop) of a controller provided in the R/D converter 30 or the like.

(3) In the embodiment described above, the first correction information M1 is formed by the first-order error reduction information L[1]. However, the present invention is not limited thereto. The first correction information M1 may be formed by superimposing at least one piece of the N-th-order error reduction information L[N] with an order of two or more on the first-order error reduction information L[1] in the same manner as the second correction information M2, and the correction amount prescribed for each piece of the N-th-order error reduction information L[N] including the first-order error reduction information L[1] may be set in accordance with the rotational speed w. In this case, the second correction information M2 may be formed by the first-order error reduction information L[1], and the correction amount prescribed by the first-order error reduction information L[1] may be set in accordance with the modulation rate R.

(4) In the embodiment described above, both the first correction information M1 and the second correction information M2 are formed to include the first-order error reduction information L[1]. However, the present invention is not limited thereto. At least one of the first correction information M1 and the second correction information M2 may be formed not to include the first-order error reduction information L[1], that is, formed on the basis of a single or a plurality of pieces of the N-th-order error reduction information L[N] with an order of other than one. For example, the first correction information M1 may be formed by the first-order error reduction information L[1], and the second correction information M2 may be formed by the N-th-order error reduction information L[N] with a higher order (such as an order of two or three, for example).

In such a case, in addition, one of the first correction information M1 and the second correction information M2 (for example, the first correction information M1) may be formed on the basis of the N-th-order error reduction information L[N] with an order of more than one, and the other (for example, the second correction information M2) may be formed to include the N-th-order error reduction information L[N] with an order that is different from that of the N-th-order error reduction information L[N] with an order of more than one. For example, the first correction information M1 may be formed by the second-order error reduction information L[2], and the second correction information M2 may be formed by superimposing the second-order error reduction information L[2] and the third-order error reduction information L[3] on each other.

In any case, the correction amount prescribed for each of the single or plurality of pieces of the N-th-order error reduction information L[N] forming the first correction information M1 may be set in accordance with the rotational speed ω, and the correction amount prescribed for each of the single or plurality of pieces of the N-th-order error reduction information L[N] forming the second correction information M2 may be set in accordance with the modulation rate R.

(5) In the embodiment described above, the operating point range of the electric motor 4 in the correction information maps are divided into a plurality of regions that do not overlap each other in accordance with the modulation rate R or the rotational speed ω, and the correction information M is prescribed for each of the regions. However, the present invention is not limited thereto. The regions prescribed in the correction information maps may overlap each other. In such a configuration, in the case where the modulation rate R or the rotational speed ω at the angle acquisition time point falls in overlapping regions, it may be decided which correction information M assigned to which region to use on the basis of other indexes (such as whether the electric motor 4 is functions as an electric motor or an electric generator, the control scheme for the inverter 6, or the system voltage Vdc). In addition, it may be decided which correction information M assigned to which region to use in consideration of the direction of variation of the modulation rate R or the rotational speed ω.

(6) In the embodiment described above, the correction information M prescribes the correction value Δθ for the detected angle θ. However, the present invention is not limited thereto. The correction information M may include only the types of a single or a plurality of pieces of the N-th-order error reduction information L[N] as constituent elements and the correction amounts (amplitude A[N]) for the single or plurality of the N-th-order error reduction information L[N], rather than directly including the correction value Δθ for the detected angle θ, and the correction information acquisition section 26 may derive the correction value Δθ for the detected angle θ on the basis of such types and correction amounts. In addition, the correction information M may prescribe a correction value for a count number of pulses included in the A-phase signal or the B-phase signal output from the R/D converter 30. In such a configuration, a detected angle represented by the count number of pulses acquired by the detected angle acquisition section 27 may be output to the detected angle correction section 28, and the detected angle correction section 28 may correct the count number of pulses to convert the detected angle into an electrical angle on the basis of the count number of pulses after being corrected.

(7) In the embodiment described above, the correction information M is prescribed for regions of the modulation rate R or the rotational speed ω. However, the present invention is not limited thereto. The correction information M may be prescribed for the modulation rate R or the rotational speed ω set discretely, and necessary correction information M may be acquired through linear interpolation or the like.

(8) In the embodiment described above, the first correction information M1 is stored in association with the rotational speed ω of the electric motor 4, and the second correction information M2 is stored in association with the modulation rate R. However, the present invention is not limited thereto. At least one of the first correction information M1 and the second correction information M2 may be stored in further association with the system voltage Vdc or the control scheme for the inverter 6.

(9) In the embodiment described above, the power source voltage of the DC power source 3 is supplied as it is as the system voltage Vdc. However, the present invention is not limited thereto. The electric motor drive device 1 may include a converter that boosts or lowers the power source voltage of the DC power source 3, and output of the converter may be supplied as the system voltage Vdc.

(10) In the embodiment described above, the AC electric motor (electric motor 4) is an interior permanent magnet synchronous motor (IPMSM) that operates on three-phase AC. However, the present invention is not limited thereto. For example, the AC electric motor may be a surface permanent magnet synchronous motor (SPMSM), or may be an induction electric motor or the like, for example, rather than a synchronous motor. The AC to be supplied to such an AC electric motor may be single-phase, two-phase, or other multi-phase AC with four or more phases, rather than three-phase AC.

(11) Also regarding other configurations, the embodiment disclosed herein is illustrative in all respects, and the present invention is not limited thereto. That is, it is a matter of course that a configuration obtained by appropriately altering part of a configuration not disclosed in the claims of the present invention also falls within the technical scope of the present invention as long as the resulting configuration includes a configuration disclosed in the claims or a configuration equivalent thereto.

The present invention may be suitably applied to a control device that controls an electric motor drive device including a DC/AC conversion section that converts a DC voltage into an AC voltage using a detected angle detected by a resolver provided in an AC electric motor to supply the resulting AC voltage to the AC electric motor.

What is claimed is:

1. A control device that controls an electric motor drive device including a DC/AC conversion section that converts a DC voltage into an AC voltage using a detected angle detected by a resolver provided in an AC electric motor to supply the resulting AC voltage to the AC electric motor, the control device comprising:
   a detected angle acquisition section that acquires a detected angle detected by the resolver;
   a correction information storage section that stores both first correction information associated with a rotational speed of the AC electric motor and second correction information associated with a modulation rate, which is a ratio of an effective value of a fundamental-wave component of the AC voltage to the DC voltage, as correction information for correcting the detected angle;
   a correction information acquisition section that acquires the first correction information on the basis of the rotational speed in the case where the rotational speed at an angle acquisition time point when the detected angle acquisition section acquires the detected angle is equal to or more than a rotational speed threshold determined in advance, and that acquires the second correction information on the basis of the modulation rate at the angle acquisition time point in the case where the rotational speed at the angle acquisition time point is less than the rotational speed threshold; and
   a detected angle correction section that corrects the detected angle on the basis of the correction information acquired by the correction information acquisition section.

2. The control device according to claim 1, wherein:
   information prescribing a correction amount for reducing an error in the detected angle due to an N-th-order error component with a cycle of an N-th part (N is a positive number) of one cycle in terms of electrical angle of the resolver included in the detected angle is defined as N-th-order error reduction information;
   both the first correction information and the second correction information are formed by a single N-th-order error reduction information or formed by superimposing a plurality of pieces of the N-tb-order error reduction information on each other;

one of the first correction information and the second correction information is formed on the basis of the N-th-order error reduction information with a specific order that is one or more; and the other of the first correction information and the second correction information is formed to include the N-th-order error reduction information with an order that is different from the specific order.

3. The control device according to claim 2, wherein:

the first correction information is formed by first-order error reduction information, and the correction amount prescribed by the first-order error reduction information is set in accordance with the rotational speed; and the second correction information is formed by superimposing at least one piece of the N-th-order error reduction information with an order of two or more on the first-order error reduction information, and the correction amount prescribed for each piece of the N-th-order error reduction information including the first-order error reduction information is set in accordance with the modulation rate.

4. The control device according to claim 1, further comprising:

a switching control section that controls switching elements provided in the DC/AC conversion section, wherein:

a number of samplings per one cycle of a sinusoidal wave that are necessary to reproduce a shape of the sinusoidal wave in a discrete system is defined as a sinusoidal-wave reproduction threshold; and the rotational speed threshold is set to a rotational speed at which a number of switchings of the switching elements per one cycle in terms of electrical angle of the resolver is equal to or more than the sinusoidal-wave reproduction threshold and equal to or less than a value that is twice the sinusoidal-wave reproduction threshold.

5. The control device according to of claim 2, further comprising:

a switching control section that controls switching elements provided in the DC/AC conversion section, wherein:

a number of samplings per one cycle of a sinusoidal wave that are necessary to reproduce a shape of the sinusoidal wave in a discrete system is defined as a sinusoidal-wave reproduction threshold; and the rotational speed threshold is set to a rotational speed at which a number of switchings of the switching elements per one cycle in terms of electrical angle of the resolver is equal to or more than the sinusoidal-wave reproduction threshold and equal to or less than a value that is twice the sinusoidal-wave reproduction threshold.

6. The control device according to of claim 3, further comprising:

a switching control section that controls switching elements provided in the DC/AC conversion section, wherein:

a number of samplings per one cycle of a sinusoidal wave that are necessary to reproduce a shape of the sinusoidal wave in a discrete system is defined as a sinusoidal-wave reproduction threshold; and the rotational speed threshold is set to a rotational speed at which a number of switchings of the switching elements per one cycle in terms of electrical angle of the resolver is equal to or more than the sinusoidal-wave reproduction threshold and equal to or less than a value that is twice the sinusoidal-wave reproduction threshold.

* * * * *